Patented Mar. 31, 1942

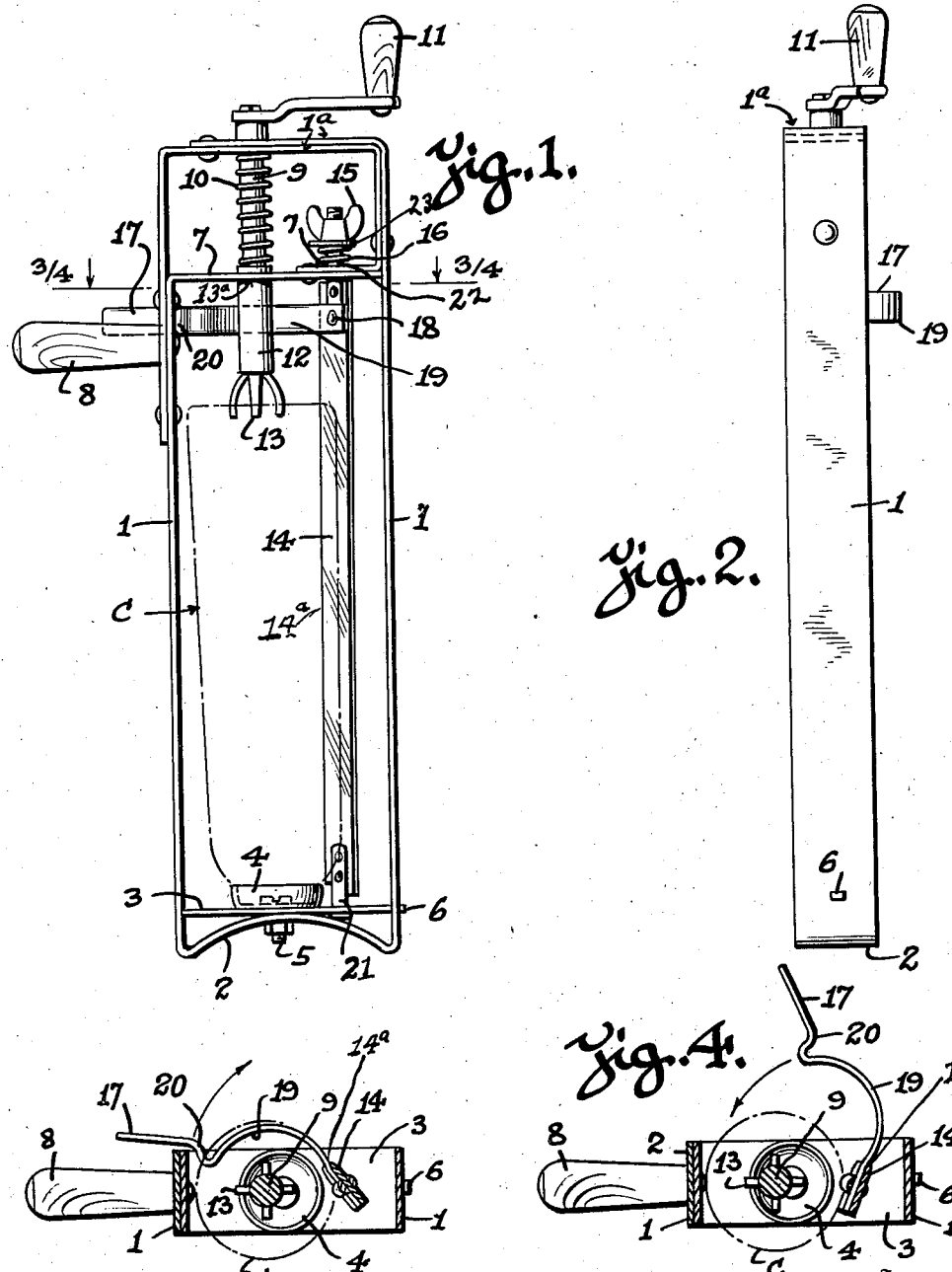

2,278,108

UNITED STATES PATENT OFFICE 2,278,108

GREEN CORN TRIMMER

Richard L. Joyce, Ballsville, Va.

Application April 19, 1941, Serial No. 389,444

3 Claims. (Cl. 146—4)

The object of my invention is to provide a new and useful green corn trimmer by means of which green corn can be conveniently trimmed or shelled from the cob; and to provide a device which is readily adjustable to ears of corn of different length.

It is also an object of my invention to provide a device of this character which can be manufactured at a reasonable cost and which can be conveniently operated manually.

I attain these and other objects of my invention by the device illustrated in the accompanying drawing, in which—

Figure 1 is a front plan view of my invention, an ear of corn being indicated by dot and dash lines;

Fig. 2 is a side elevation of my invention;

Fig. 3 is a transverse section on line 3—3 of Fig. 1 with arm 19 and bar 14 in closed position; and Fig. 4 is a section on line 4—4 of Fig. 1 with the bottom 19 and bar 14 in open position.

Like characters of reference designate like parts in each of the views.

Referring to the accompanying drawing, I provide a main frame consisting of parallel bars 1, integral and arcuate end bar 2 and overlapping top bars 1a. The base bar 3 carries a cob cup 4 and both of said members are secured to the arcuate end bar 2 of the main frame 1 by suitable securing means such as bolt 5, and tongue 6. A transverse bar 7 near the top of main frame 1 is affixed to or integral with the main frame. A handle 8 is rigidly affixed to one side of the main frame, near its upper end, as shown in Figs. 1, 3 and 4. Extending through the top transverse bars 1a of the main frame is a shaft 9 on which is mounted a control spring 10, the upper end of which spring abuts against the top end 1a of the main frame 1, and the lower end of which spring abuts against the upper end of the enlargement 12 of the cylindrical shaft 9. This enlarged cylindrical shaft section 12 is longitudinally slidable in a corresponding aperture 13a in the transverse bar 7. Member 12 terminates in corn cob engaging tines 13, which are adapted to project into the upper end of a corn cob C, the lower end of which is seated in a cob cup 4.

I also provide a corn-trimming blade 14 affixed to the lower end to the cylindrical bar 21, which is rotatably mounted in the base bar 3. The upper end of the corn-trimming blade 14 is affixed to the cylindrical bar 22 which is rotatably mounted in the transverse plate 7 and terminates in a screw-threaded end on which an adjusting wing-nut 15 is mounted. Wing-nut 15 bears against the washer 23 which in turn bears against a spring 16. The lower end of spring 16 abuts against the top surface of transverse bar 7 and thus tends to raise the corn-trimming blade 14 to prevent lower end of the blade contacting with the cob cup 4.

A curved bar 19 is affixed by rivets 18 to the upper end of the corn-trimming blade 14. This arcuate blade 19 is curved to avoid contact with the corn cob if a long ear of corn is inserted, and is bent in offset direction at 20, and which also functions as a stop element to contact with the frame 1, and terminates in the handle portion 17, which may be grasped to swing and control the position of the cutting edge 14a of the corn-trimming blade 14, as indicated by the arrows in Figs. 3 and 4, which show two different positions of the blade 14.

In operation, the shaft 9, 12 is raised sufficiently to permit insertion of the lower end of the ear of corn in the cob cup 4, and the upper end of the ear of corn is then engaged by the tines 13 carried on the lower end of the enlarged shaft 12. The device is held in one hand by the handle 8, one finger of that same hand engaging the handle portion 17 of the bar 19 which controls the position of the corn-trimming blade 14. The corn cob is rotated by turning the crank 11, which in turn rotates the shaft 9, 12 and tines 13, which engage the ear of corn, whereby the kernels of the ear of corn can be quickly and conveniently trimmed or shelled manually.

What I claim is:

1. In a green corn trimmer, the combination of a main frame, a cob cup carried by the bottom of the main frame, a cylindrical shaft longitudinally slidable in the transverse bars at the top of the main frame, corn engaging tines carried by the said shaft at its lower end, a crank affixed to and adapted for rotating the shaft, a spring tending to hold the shaft in its lowermost position, a handle affixed to the main frame for holding same, a corn-trimming blade extending longitudinally of the main frame and swingably mounted on same, a bar affixed to the said corn trimming blade near one end and terminating in an offset handle in proximity to the handle affixed to the main frame, whereby the position of the corn trimming blade can be controlled by one of the fingers of the hand which grasps the handle affixed to the main frame.

2. In a green corn trimmer, the combination of a main frame, a cob cup carried by the bottom of the main frame, a cylindrical shaft longitudinally slidable in the transverse bars at the top of the main frame, corn engaging tines carried by the said shaft at its lower end, a crank affixed to and adapted for rotating the shaft, a handle affixed to the main frame for holding same, a corn-trimming blade extending longitudinally of the main frame and swingably mounted on same, a bar affixed to the said corn-trimming blade near one end and terminating in an offset handle in proximity to the handle affixed to the main frame, whereby the position of the corn-trimming blade can be controlled by one of the fingers of the hand which grasps the handle affixed to the main frame.

3. In a green corn trimmer, the combination of a main frame, a cob cup carried by the bottom of the main frame, a cylindrical shaft longitudinally slidable in the transverse bars at the top of the main frame, corn engaging tines carried by the said shaft at its lower end, a crank affixed to and adapted for rotating the shaft, a spring tending to hold the shaft in its lowermost position, a handle affixed to the main frame for holding same, a corn-trimming blade extending longitudinally of the main frame and swingably mounted on same, a bar affixed to the said corn trimming blade near one end and terminating in an offset handle in proximity to the handle affixed to the main frame, whereby the position of the corn-trimming blade can be controlled by one of the fingers of the hand which grasps the handle affixed to the main frame, a spring tending to hold the corn-trimming blade in its uppermost position whereby to avoid its striking the cob cup.

RICHARD L. JOYCE.